United States Patent
Morishima

(10) Patent No.: US 10,118,566 B2
(45) Date of Patent: Nov. 6, 2018

(54) IMAGE PROCESSING DEVICE, IMAGE PROCESSING METHOD, AND IMAGE DISPLAY SYSTEM

(71) Applicant: KYOCERA CORPORATION, Kyoto (JP)

(72) Inventor: Riyou Morishima, Setagaya-ku (JP)

(73) Assignee: KYOCERA Corporation, Kyoto (JP)

( * ) Notice: Subject to any disclaimer, the term of this patent is extended or adjusted under 35 U.S.C. 154(b) by 431 days.

(21) Appl. No.: 14/381,074

(22) PCT Filed: Feb. 27, 2013

(86) PCT No.: PCT/JP2013/001176
§ 371 (c)(1),
(2) Date: Aug. 26, 2014

(87) PCT Pub. No.: WO2013/128917
PCT Pub. Date: Sep. 6, 2013

(65) Prior Publication Data
US 2015/0009285 A1    Jan. 8, 2015

(30) Foreign Application Priority Data

Feb. 27, 2012    (JP) ................. 2012-040695

(51) Int. Cl.
*H04N 7/00*    (2011.01)
*B60R 11/04*    (2006.01)
(Continued)

(52) U.S. Cl.
CPC ............. *B60R 11/04* (2013.01); *B60R 1/00* (2013.01); *H04N 5/23216* (2013.01);
(Continued)

(58) Field of Classification Search
None
See application file for complete search history.

(56) References Cited

U.S. PATENT DOCUMENTS

2007/0088474 A1*    4/2007 Sugiura ............... B60R 1/00
                                                                       701/36
2010/0002081 A1*    1/2010 Pawlicki ........... B60K 31/0008
                                                                       348/148
(Continued)

FOREIGN PATENT DOCUMENTS

EP    2181892 A1    5/2010
EP    2481637 A1    8/2012
(Continued)

OTHER PUBLICATIONS

The extended European search report issued by the European Patent Office dated Oct. 1, 2015, which corresponds to European Patent Application No. 13754749.3-1503 and is related to U.S. Appl. No. 14/381,074.

(Continued)

Primary Examiner — James M Anderson, II
(74) Attorney, Agent, or Firm — Studebaker & Brackett PC

(57) ABSTRACT

An image processing device, an image processing method, and an image display system allow a driver to obtain a sense of direction and a sense of distance with wide-angle image captured by a car-mounted camera. An image processing device (40) for superimposing predetermined information on image captured by a camera (12) that attaches to a vehicle (100) and is capable of wide-angle capturing in a travelling direction of the vehicle (100) includes a controller (14) that performs control to superimpose information upon detecting, in a state of outputting image captured by the camera (12), input indicating a predetermined position in the image, the information relating to a distance between the vehicle (100) and the position indicated in the image captured by the camera (12).

18 Claims, 13 Drawing Sheets

(51) Int. Cl.
  *B60R 1/00* (2006.01)
  *H04N 7/18* (2006.01)
  *H04N 5/232* (2006.01)
  *H04N 5/262* (2006.01)

(52) U.S. Cl.
  CPC .......... *H04N 7/18* (2013.01); *B60R 2300/305* (2013.01); *B60R 2300/806* (2013.01); *H04N 5/2621* (2013.01)

(56) References Cited

U.S. PATENT DOCUMENTS

2012/0194355 A1* 8/2012 Thomas .................... B60R 1/00
                                                       340/932.2
2013/0002861 A1   1/2013 Mitsugi

FOREIGN PATENT DOCUMENTS

| JP | H08-315299 A | | 11/1996 | |
|---|---|---|---|---|
| JP | H08315299 A | * | 11/1996 | |
| JP | 2003-141693 A | | 5/2003 | |
| JP | 2003141693 A | * | 5/2003 | |
| JP | 2006-311222 A | | 11/2006 | |
| JP | 2006-330745 A | | 12/2006 | |
| JP | 2006330745 A | * | 12/2006 | |
| JP | 2007-116377 A | | 5/2007 | |
| JP | 2009-187181 A | | 8/2009 | |
| JP | 2010-187163 A | | 8/2010 | |
| JP | 2010-287163 A | | 12/2010 | |
| JP | 2010287163 A | * | 12/2010 | |
| JP | WO 2011154987 A1 | * | 12/2011 | ............... G01C 3/00 |
| WO | 2009/036176 A1 | | 3/2009 | |
| WO | 20111154987 A1 | | 12/2011 | |

OTHER PUBLICATIONS

An Office Action; "Notice of Reasons for Rejection," issued by the Japanese Patent Office dated Feb. 2, 2016, which corresponds to Japanese Patent Application No. 2012-040695 and is related to U.S. Appl. No. 14/381,074; with English language concise explanation.
International Search Report; PCT/JP2013/001176; dated Apr. 23, 2013.
Written Opinion of the International Searching Authority; PCT/JP2013/001176; dated Apr. 23, 2013.

\* cited by examiner

FIG. 4

| X\Y | 0 | 1 | 2 | • | • | • | 319 | • | • | • | 638 | 639 |
|---|---|---|---|---|---|---|---|---|---|---|---|---|
| 0 | 3000 | 2850 | 2700 | • | • | • | 2000 | • | • | • | 2850 | 3000 |
| 1 | 2800 | 2500 | 2200 | • | • | • | 1500 | • | • | • | 2500 | 2800 |
| 2 | 2500 | 2200 | 1900 | • | • | • | 1200 | • | • | • | 2200 | 2500 |
| • | • | • | • | • | • | • | • | • | • | • | • | • |
| • | • | • | • | • | • | • | • | • | • | • | • | • |
| 239 | 1000 | 900 | 800 | • | • | • | 500 | • | • | • | 900 | 1000 |
| • | • | • | • | • | • | • | • | • | • | • | • | • |
| • | • | • | • | • | • | • | • | • | • | • | • | • |
| 478 | 50 | 45 | 40 | • | • | • | 20 | • | • | • | 45 | 50 |
| 479 | 0 | 0 | 0 | • | • | • | 0 | • | • | • | 0 | 0 |

IMAGE PROCESSING DEVICE, IMAGE PROCESSING METHOD, AND IMAGE DISPLAY SYSTEM

CROSS-REFERENCE TO RELATED APPLICATION

This application claims priority to and the benefit of Japanese Patent Application No. 2012-40695 filed Feb. 27, 2012, the entire contents of which are incorporated herein by reference.

TECHNICAL FIELD

The present invention relates to an image processing device, an image processing method, and an image display system. In greater detail, the present invention relates to an image processing device and an image processing method that process image captured with a camera attached to a vehicle, and to an image display system that includes the image processing device.

BACKGROUND

In recent years, techniques have become known for capturing image of the outside of a car with a car-mounted camera and displaying the image on a display, such as a display installed within the car, in order to assist the driver in confirming safety.

For example, one technique attempts to improve safety in situations such as entering an intersection from a street with poor visibility by installing a camera near the front edge of the car and showing the driver in the car image captured in front of the car, i.e. in the travelling direction. Another technique attempts to improve safety when the driver drives the car in reverse by installing a camera at a position allowing for capturing behind the car and showing the driver in the car image centering on the scene behind the car.

Such techniques typically use a camera allowing for wide-angle capturing, i.e. a camera with a lens having a wide field of view, such as a wide-angle lens (for example, see Patent Literature 1). One reason is that when displaying image on the display, image captured with a camera capable of wide-angle capturing allows the driver visually to confirm a wider range on one screen.

CITATION LIST

Patent Literature 1: JP 2006-311222 A

SUMMARY

As is also clear from Patent Literature 1, however, image captured with a camera that is capable of wide-angle capturing and is used as a car-mounted camera normally becomes distorted gradually from the center of the image towards the outer edges.

For example, as illustrated in FIG. 12, the case of capturing image behind a car 100 with a camera 120 capable of wide-angle capturing, installed at the back portion of the car 100, is described. FIG. 12 is a view from above showing a car stopped in a parking lot and showing the surroundings of the parking lot. In the example illustrated in FIG. 12, the camera 120 can capture image with a horizontal field of view of approximately 180°, as indicated by the arc with arrows on either end. In the parking lot illustrated in FIG. 12, the position at which each car should park is indicated by white lines 300, which represent parking positions. A building 400 stands in the vicinity of the parking lot.

FIG. 13 shows the result when image captured behind the car 100 with the camera 120 in the circumstances illustrated in FIG. 12 is displayed on a display 160, such as a display, installed within the car. As illustrated in FIG. 13, the portion of the white lines 300 that is actually horizontally straight is displayed as curving greatly, with the curvature increasing closer towards the edges of the screen. The portions of the white lines 300 that are actually parallel to the direction in which the car 100 moves in reverse are also displayed at an increasing angle from the reverse direction of the car 100 closer towards the edges of the screen. Furthermore, even though these parallel portions actually occur at equal intervals, they are not displayed on the display 160 at equal intervals.

In general, image captured with such a camera is not very distorted in the central portion, yet distortion increases with distance from the central portion, growing quite large at the edges of the image. Therefore, even with the assistance of such a distorted image, the driver cannot easily discern the distance between the car and another object and moreover cannot easily discern the direction of another object with reference to the travelling direction of the car.

Accordingly, the present invention has been conceived in light of the above circumstances and provides an image processing device, an image processing method, and an image display system that allow the driver to obtain a sense of direction and a sense of distance with wide-angle image captured by a car-mounted camera.

A first aspect of the present invention is an image processing device for superimposing predetermined information on image captured by a camera that attaches to a vehicle and is capable of wide-angle capturing in a travelling direction of the vehicle, the image processing device including: a controller configured to perform control to superimpose information upon detecting, in a state of outputting image captured by the camera, input indicating a predetermined position in the image, the information relating to a distance between the vehicle and the position indicated in the image captured by the camera.

The controller preferably performs control to superimpose the predetermined information as a reference line connecting points at a distance from the vehicle equivalent to a distance from the vehicle of the position indicated in the image captured by the camera.

The controller preferably performs control so that in accordance with change in the image captured by the camera as the vehicle moves, the reference line has a curvature corresponding to distortion of the image captured by the camera.

The controller preferably performs control to display, within each of a plurality of regions yielded by dividing the image captured by the camera in accordance with a distance between a subject and the vehicle, a reference line with a same curvature.

A storage configured to store a distance between the vehicle and a subject in the image at coordinates of the image captured by the camera is preferably further included, and the controller preferably performs control to superimpose the predetermined information by reading the distance, stored in the storage, between the vehicle and the subject in the image at coordinates of the image captured by the camera.

The controller preferably performs control to superimpose the predetermined information as a reference value representing a distance between the vehicle and a subject at the indicated position as a numerical value.

When a predetermined object is recognized as existing at the position at which the input is detected, the controller preferably performs control to superimpose the predetermined information using, as a standard, a position that is near a ground contact point of the predetermined object and is closest to the vehicle.

In accordance with change in the image captured by the camera as the vehicle moves, the controller preferably performs control to change a position of the predetermined information that is superimposed.

In accordance with a distance between the vehicle and a subject at the indicated position, the controller preferably performs control to change a display state of the predetermined information that is superimposed.

When superimposing the predetermined information on the image captured by the camera, the controller preferably performs control to superimpose a guideline suggesting a path for the vehicle.

The controller preferably performs control to superimpose the guideline by changing the guideline in accordance with a steering angle of the vehicle.

An input detector configured with a touch panel is preferably further included, and the controller preferably performs control to detect input indicating a predetermined position in the image via the input detector.

An input detector configured with an operation key is preferably further included, and the controller preferably performs control to detect input indicating a predetermined position in the image via the input detector.

The image captured by the camera is preferably image captured by a camera comprising a fisheye lens.

The image captured by the camera is preferably a combination of images captured by a plurality of cameras.

A second aspect of the present invention is an image processing method for superimposing predetermined information on image captured by a camera that attaches to a vehicle and is capable of wide-angle capturing in a travelling direction of the vehicle, the image processing method including the step of: performing control to superimpose information upon detecting, in a state of outputting image captured by the camera, input indicating a predetermined position in the image, the information relating to a distance between the vehicle and the position indicated in the image captured by the camera.

A third aspect of the present invention is an image display system including: a camera that attaches to a vehicle and is capable of wide-angle capturing in a travelling direction of the vehicle; a controller configured to superimpose predetermined information on image captured by the camera; a display configured to display the image captured by the camera and the predetermined information; and an input detector configured to detect input indicating a predetermined position in the image displayed on the display, such that in a state of the display displaying image captured by the camera, when the input detector detects input indicating a predetermined position in the image, the controller performs control to superimpose information relating to a distance between the vehicle and the position indicated in the image captured by the camera.

According to the image processing device, image processing method, and image display system of the present invention, a driver can obtain a sense of direction and a sense of distance with wide-angle image captured by a car-mounted camera.

BRIEF DESCRIPTION OF DRAWINGS

The present invention will be further described below with reference to the accompanying drawings, wherein:

FIG. 4 shows how the distance between the vehicle and a subject in the image corresponds to coordinates of the image captured by the camera in Embodiment 1;

DESCRIPTION OF EMBODIMENTS

The following describes embodiments of the present invention with reference to the drawings.

(Embodiment 1)

Figure 1:
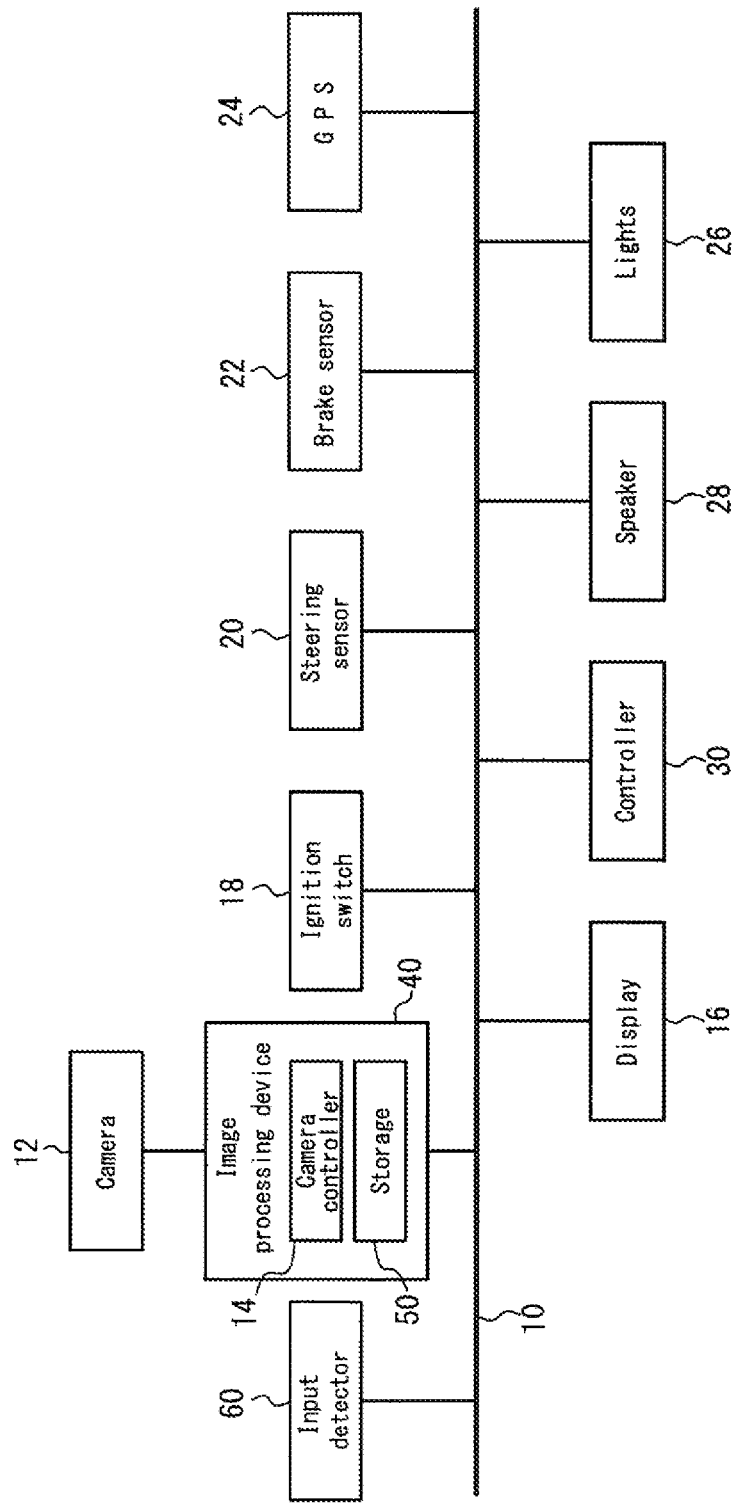
FIG. 1 schematically illustrates the structure of an image display system according to Embodiment 1 of the present invention.

FIG. 1 schematically illustrates an example of the structure of an image display system that includes an image processing device according to Embodiment 1 of the present invention. As illustrated in FIG. 1, the image display system of the present embodiment includes a camera 12, a camera controller 14, a display 16, and an input detector 60. As also illustrated in FIG. 1, the image processing device 40 according to the present embodiment is provided with the camera controller 14 and a storage 50. The image processing device 40 according to the present embodiment is assumed to be installed in a vehicle 100 such as a car or the like. However, the image processing device 40 may of course be used when installed in a vehicle other than a car.

As illustrated in FIG. 1, in the image display system according to the present embodiment, components constituting a variety of functions are connected to a bus 10. The image processing device 40 connected to the bus 10 is provided with the camera controller 14, and the camera 12 is connected to the camera controller 14. Among the other electronic components provided in the car, the main components connected to the bus 10 include the display 16, an ignition switch 18, a steering sensor 20, a brake sensor 22, a GPS 24, lights 26, a speaker 28, a controller 30, the input detector 60, and the like. Among the functional units with which the car is configured, the following explanation focuses on components for which a variety of information, such as image, is acquired and components for which a variety of information, such as image, is output. Components constituting other functional units are omitted from the drawings and are not described.

The camera 12 is provided with a lens having a wide field of view, such as a fisheye lens or the like, and is capable of wide-angle capturing. Image captured by the camera 12 is transmitted to the camera controller 14 of the image processing device 40. The camera controller 14 performs control so that processing is executed to superimpose predetermined information, described below, according to the present embodiment on the image captured by the camera 12 and also performs a variety of control related to the camera 12. For example, in FIG. 1 the camera 12 is illustrated as one component, yet a plurality of cameras 12 may also be provided. In this case, the camera controller 14 performs control for the plurality of cameras 12 to work together. After processing and combining a plurality of images transmitted from the plurality of cameras 12, the camera controller 14 performs control so that processing is executed to superimpose the predetermined information.

The image processing device 40 outputs image in which the predetermined information is superimposed by the camera controller 14 on the image captured by the camera 12. In the present embodiment, as illustrated in FIG. 1, the image processing device 40 is described as a unit provided with the camera controller 14 and is described as receiving input of image from the external camera 12. The image processing device 40, however, may be configured as an overall camera unit that includes the camera controller 14, the camera 12, and the storage 50.

The display 16 is configured, for example, with a liquid crystal display, organic EL display, or the like, and displays a variety of information, image, and the like. For example, the display 16 can display different types of vehicle information for the vehicle 100 and can display a navigation system screen using the GPS 24. In the present embodiment, the display 16 displays the image output by the image processing device 40.

The ignition switch 18 is a switch for starting or stopping the engine of the vehicle 100. Since many of the electronic devices in the vehicle 100 are powered up by turning on the accessories, however, the ignition switch 18 substantially functions as the main switch for the image display system.

The steering sensor 20 detects the turning angle of the steering. The brake sensor 22 detects whether the brakes of the vehicle 100 are operating, the degree of braking, and the like. The GPS 24 can acquire information on the current location by receiving GPS signals from GPS satellites through an antenna. The lights 26 collectively refer to the headlights, the position lamps, and the like in the vehicle 100. The lit/unlit status of these headlights, position lamps, and the like can be learned from the bus 10. The speaker 28 outputs not only audio for the car stereo but also voice guidance for the car navigation, warning sounds from a variety of warning systems, and the like.

The controller 30 controls processing related to electronic control of the vehicle 100 and controls the various functional units of the vehicle 100. Specifically, the controller 30 may, for example, be a computer to which the car navigation system and the like are connected, or the other functional units may fulfill the functions of the controller 30.

The storage 50 may be configured using any memory, such as flash memory. In the present embodiment, as described below, the storage 50 stores the distance between the vehicle 100 and a subject in the image at coordinates of the image captured by the camera 12. The storage 50 is also described here as being able to store a variety of information.

The input detector 60 detects an input operation by the operator of the vehicle 100, such as the driver. In the present embodiment, the input detector 60 may be configured using operation keys such as predetermined keys or buttons, for example on a keyboard, a dedicated controller, or the like. Below, however, the input detector 60 is described as being configured using a touch panel that can detect input such as when the operator directly contacts the image or an object displayed on the display 16.

Figure 2:
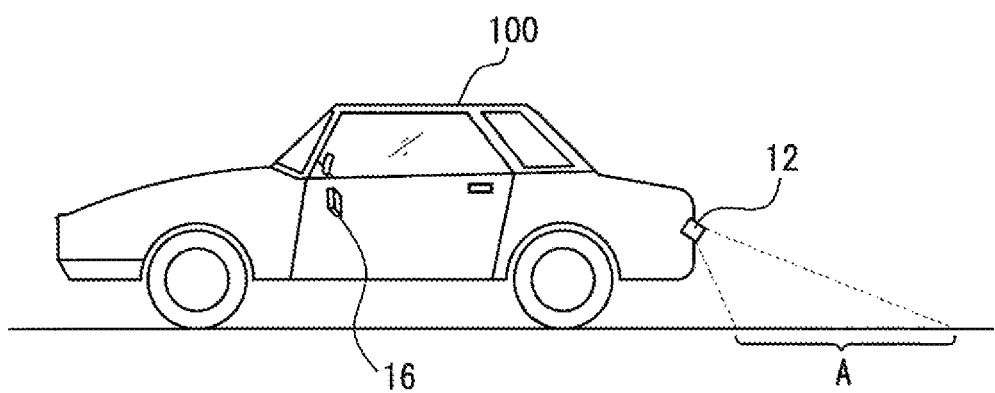
FIG. 2 illustrates the relationship between a subject and a vehicle in Embodiment 1.

Next, the relationship between a subject and the vehicle 100 in the present embodiment is described. FIG. 2 illustrates the relationship between the vehicle 100 and a subject in the image captured by the camera 12 in Embodiment 1. As illustrated in FIG. 2, in the present embodiment, the camera 12 is mounted at a position allowing for capturing behind the vehicle 100, which for example is a car. Furthermore, in the present embodiment, the camera 12 captures image of the road surface behind the vehicle 100, objects on the road surface, and the like. Accordingly, in the present embodiment, the "subject" in the image captured by the camera 12 typically refers to the road surface behind the vehicle 100, objects on the road surface, and the like.

In FIG. 2, the region of the subject in the image captured by the camera 12 is indicated as region A behind the vehicle 100. In region A, when an object such as a barrier is located on the road surface, the subject of capturing in the image captured by the camera 12 is not only the road surface of the region A but also the object on the road surface. The image of the subject thus captured by the camera 12 is input into the image processing device 40 illustrated in FIG. 1. The image processing device 40 outputs image of the subject and can display the image on the display 16. Generally, the display 16 illustrated in FIG. 2 is disposed inside the vehicle 100 so as to allow for visual confirmation by the driver of the vehicle 100.

In the example illustrated in FIG. 2, the case of moving in reverse is mainly described, and therefore an example of providing the camera 12 at a position allowing for capturing behind the vehicle 100 is illustrated. The present invention is not, however, limited to such an example, and for the case of the vehicle 100 moving forwards, the camera 12 may be disposed at a position allowing for capturing in front of the vehicle 100.

Next, the distance between the vehicle and the subject in the image captured by the camera 12 in Embodiment 1 is described.

As described above, in the present embodiment, the camera 12 is capable of wide-angle capturing. Hence, the image captured by the camera 12 typically includes distortion. Accordingly, when image of the subject captured by the camera 12 is displayed on the display 16, lines appearing straight on the display 16 may not actually be straight lines, and points on the ground that are equidistant from a predetermined position on the display 16 may not actually be equidistant. Therefore, by merely referring to the image displayed on the display 16, it is difficult for the driver of the vehicle 100 to correctly obtain a sense of direction and a sense of distance relative to the vehicle 100.

Therefore, the image processing device 40 according to the present embodiment superimposes predetermined information on the image captured by the camera 12 that attaches to the vehicle 100 and is capable of wide-angle capturing in the travelling direction of the vehicle 100. The "predetermined information" in the present embodiment refers to a predetermined reference line, as described below. Based on this reference line, the driver of the vehicle 100 can correctly obtain a sense of direction and a sense of distance relative to the vehicle 100.

In the present embodiment, in order to provide such a reference line, the camera controller 14 determines in advance the distance between the vehicle 100 and the subject in the image at coordinates of the image captured by the camera 12 based on distortion data unique to the lens of the camera 12. In other words, the camera controller 14 determines the distance by, for example, storing in advance information on the distance between the vehicle 100 and the subject in the captured image at predetermined coordinates (or dots, pixels, or the like) of the image captured by the camera 12 and displayed on the display 16.

Figure 3:
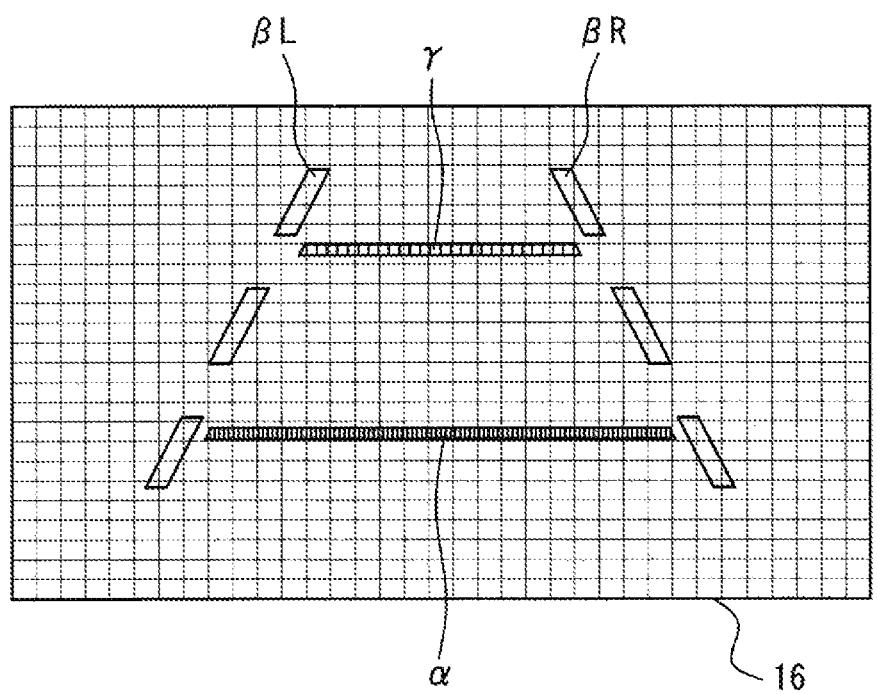
FIG. 3 illustrates the distance between the vehicle and a subject in image captured by a camera in Embodiment 1.

FIG. 3 shows the image displayed on the display 16 divided into regions corresponding to predetermined coordinates. In FIG. 3, the image displayed on the display 16 appears in grid form, with each of the regions divided by the grid representing a region corresponding to predetermined coordinates. In FIG. 3, for the sake of illustration, the image displayed on the display 16 appears in grid form, yet the actual display on the display 16 need not display the image in grid form as illustrated in FIG. 3. Furthermore, in order to simplify the depiction in FIG. 3, the predetermined coordinates are illustrated at relatively low (i.e. rough) resolution in the image displayed on the display 16. In practice, any resolution may be used. For example, the predetermined coordinates may be defined at a high (i.e. fine) resolution, such as pixel by pixel, or defined for each of a group of pixels in the image displayed on the display 16.

In the present embodiment, for each of the coordinates of the regions divided as illustrated in FIG. 3, the distance between the vehicle 100 and a subject displayed at the position of the coordinates is determined in advance for all coordinates. FIG. 4 shows how the distance between the vehicle and a subject in the image corresponds to coordinates of the image captured by the camera 12. In other words, in correspondence with the coordinates of the regions divided as illustrated in FIG. 3, FIG. 4 lists the distance between the vehicle 100 and a subject displayed at the position of the coordinates. In order to simplify the illustration, however, portions of FIG. 4 are omitted.

For example, at the coordinates at the top left in FIG. 3, when a point that is actually 3 m from the vehicle 100 is captured by the camera 12 and displayed on the display 16, the coordinates (X, Y)=(0, 0) at the top left in FIG. 4 corresponding to these coordinates are given a value of 3000. In other words, for the coordinates at the top left in FIG. 3, it can be determined that the subject in the image displayed at these coordinates is 3000 mm from the vehicle 100 by referring to the coordinates (X, Y)=(0, 0) in FIG. 4. Similarly, the coordinates (X, Y)=(639, 479) at the bottom right in FIG. 4 also correspond to the coordinates at the bottom right in FIG. 3, and a value of zero is given to these coordinates. In other words, a subject in the image displayed at these coordinates is 0 mm away from the vehicle 100. This means that the subject displayed at the coordinates at the bottom right in FIG. 3 is actually a distance of zero from the vehicle 100. As is clear from FIG. 4, the image captured by the camera 12 includes distortion, and therefore when comparing different points with the same Y coordinate, the distance from the subject to the vehicle 100 is not necessarily the same. Specifically, even if the Y coordinate is the same, the value is smallest along the X coordinate axis near the center (X=319) and grows larger towards the edges (X=0 or 639).

The numerical value thus representing the distance for each of the coordinates differs depending on distortion data unique to the lens mounted on the camera 12 and also varies depending on a variety of parameters, such as the vertical height, angle, and the like at which the camera 12 is mounted on the vehicle 100. Accordingly, a correspondence table such as the one in FIG. 4 is provided in accordance with the lens mounted on the camera 12 and with parameters such as the vertical height, angle, and the like at which the camera is mounted on the vehicle 100. For correspondence tables such as the one in FIG. 4, numerical values may be stored for each coordinate in advance in the storage 50, or calculation formulas for different cases may be stored in the storage 50, and the numerical values may be calculated as necessary. In this way, in the present embodiment, the storage 50 stores the distance between the vehicle 100 and a subject in the image at coordinates of the image captured by the camera 12.

In the image displayed on the display 16 in FIG. 3, a variety of guidelines are displayed to guide the driver when moving the vehicle 100 in reverse. For example, the guideline α represents a relatively close interval, such as 1 m from the vehicle 100. Therefore, if an object is displayed near the guideline α, this indicates that the object is located very close to the vehicle 100. The guidelines βR and βL are based on the width of the vehicle 100 and represent directions parallel to the travelling direction of the vehicle. In FIG. 3, the guidelines βR and μL are indicated by dashed lines. The guideline γ represents a slightly distant interval, such as 3 m from the vehicle 100. Therefore, if an object is displayed near the guideline γ, this indicates that the object is located slightly distant from the vehicle 100.

Next, an example of processing by the image processing device 40 according to the present embodiment is described.

Figure 5:
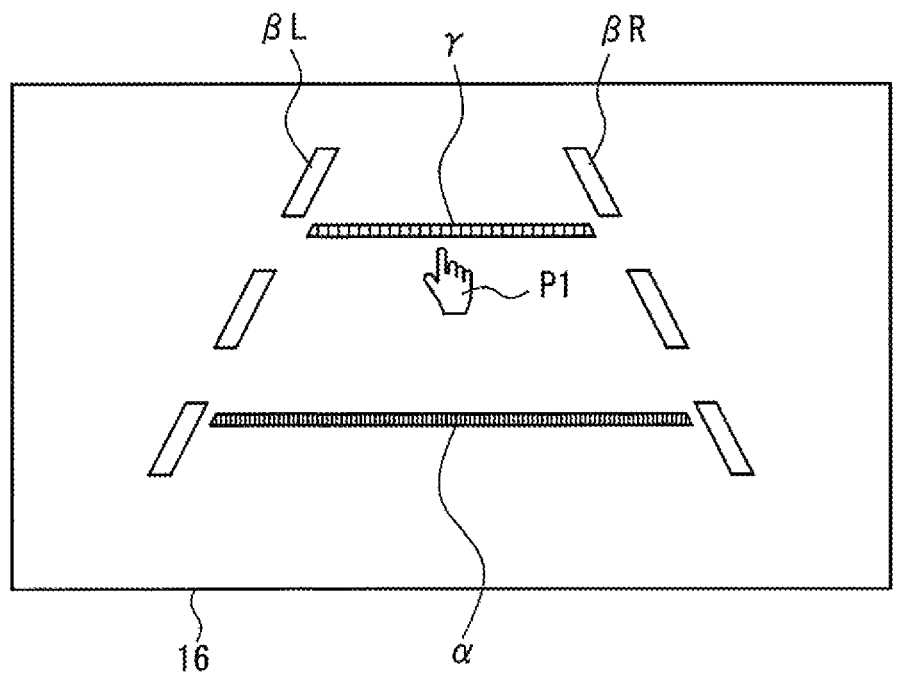
FIG. 5 illustrates an example of displaying image captured by the camera in Embodiment 1.

Like FIG. 3, FIG. 5 represents the state in which image captured by the camera 12 is displayed on the display 16. The guidelines α, βR, βL, and γ illustrated in FIG. 5 are as described with reference to FIG. 3. In the example in FIG. 5, only the ordinary road surface is displayed as the subject in the image captured by the camera 12 and displayed on the display 16. In particular, no barrier or other such object is displayed.

In such circumstances, via the input detector 60, which is a touch panel, the camera controller 14 performs control to detect input for which a predetermined position on the image is indicated. In other words, the camera controller 14 performs control to detect input by which the driver contacts any position on the input detector 60, which is a touch panel.

For example, as illustrated in FIG. 5, assume that input is detected by which the driver contacts position P1 near the center of the image displayed on the display 16. Upon detection of input thus indicating a predetermined position in the displayed image, the camera controller 14 reads from the storage 50 the distance between the vehicle 100 and the subject at that position based on correspondence such as that illustrated in FIG. 4. The camera controller 14 then reads the positions of other coordinates for which the distance is equivalent to the distance between the vehicle 100 and the subject at the predetermined position, based on the correspondence such as that illustrated in FIG. 4. Once a plurality of positions of coordinates is thus read, the camera controller 14 performs control to superimpose, on the image captured by the camera 12, a reference line connecting these points. In this case, the camera controller 14 performs control to superimpose the predetermined information by reading, from the storage 50, the distance between the vehicle 100 and the subject in the image at coordinates of the image captured by the camera 12.

Figure 6A:
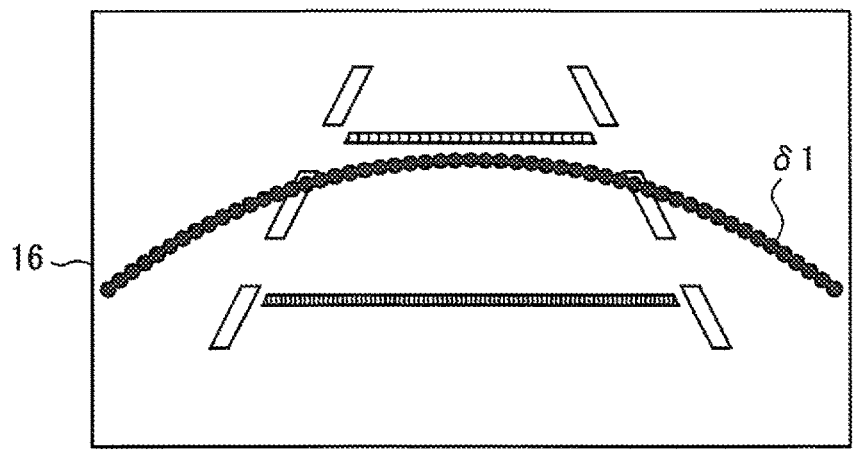
FIGS. 6A, 6B, and 6C illustrate an example of the reference line in Embodiment 1.

In this way, the reference line superimposed, in the display 16, on the image captured by the camera 12 includes the position of the subject displayed at the position for which input by the driver was detected, and is the set of points indicating the positions of subjects for which the actual distance from the vehicle 100 is equivalent. FIG. 6A illustrates a reference line δ1 that includes the position of the subject displayed at position P1 in FIG. 5, where input is detected, and that connects a plurality of points indicating the positions of subjects for which the actual distance from the vehicle 100 is equivalent. By visually confirming the reference line δ1, the driver can easily confirm, within the entire image displayed on the display 16, positions that are distant from the vehicle 100 by the same distance as the position of the subject displayed at the position input by the driver on the image.

In this way, in the present embodiment, while outputting image captured by the camera 12, the camera controller 14 performs control to superimpose predetermined information upon detecting input indicating a predetermined position in the image. Among the information relating to the distance between the vehicle 100 and the subject in the image captured by the camera 12, this predetermined information is information corresponding to the indicated position. In particular, in the present embodiment, the predetermined information is a reference line connecting points for which the distance between the vehicle 100 and the subject in the image captured by the camera 12 is equivalent to the distance between the vehicle 100 and the subject displayed at the indicated position. Specifically, for example in FIG. 5, the coordinates corresponding to position P1 are specified as described with reference to FIG. 3, and the value listed in FIG. 4 in correspondence with the specified coordinates is read. Furthermore, in FIG. 4, coordinates having the same value as the read value are extracted. Connecting the points corresponding to the sequence of extracted coordinates yields the reference line δ1 illustrated in FIG. 6A.

After the reference line δ1 as illustrated in FIG. 6A is displayed, as the driver moves the vehicle 100, the location being captured of course shifts along the travelling direction, and therefore in the display 16, the image captured by the camera 12 shifts along with movement of the vehicle 100. In this case, along with movement of the vehicle 100, the position at which input by the driver was detected also shifts on the display 16. Hence, it is thought that also shifting the display of the reference line δ will assist the driver in confirming safety. Therefore, if the position at which input by the driver is detected shifts in coordinates as illustrated in FIG. 4, the camera controller 14 preferably performs control to superimpose the reference line for the shifted coordinates.

Figure 6B:
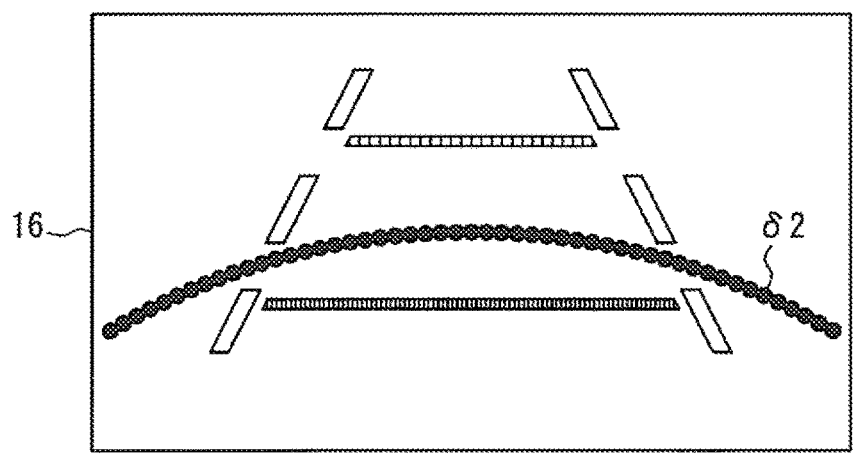
Figure 6C:
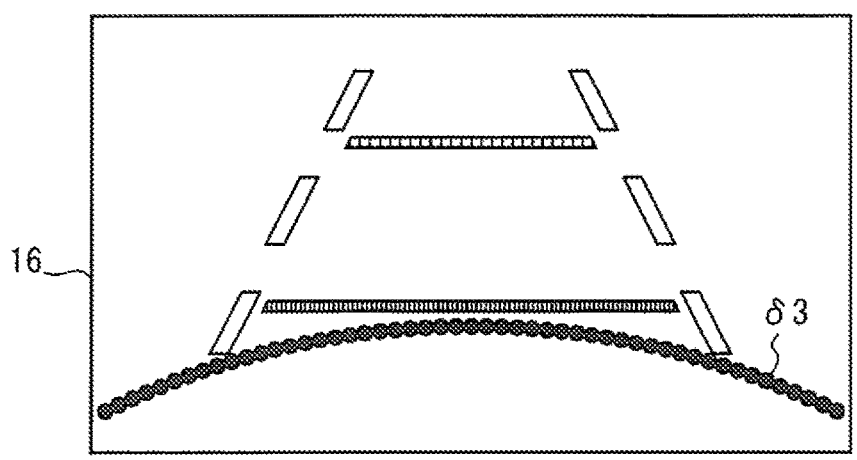

With this approach, when the driver moves the vehicle 100 from the situation illustrated in FIG. 6A, the image captured by the camera 12 shifts on the display 16, and as illustrated in FIG. 6B, the reference line also changes from the reference line δ1 to the reference line δ2. In this case, since the vehicle 100 is moving, the reference line is displayed on the display 16 as gradually coming closer. In the display 16, since the degree of distortion differs between the position at which the reference line δ1 is displayed and the position at which the reference line δ2 is displayed, the reference line δ1 and reference line δ2 are displayed as reference lines with different curvatures. Upon the driver moving the vehicle 100 further from the situation illustrated in FIG. 6B, the image captured by the camera 12 shifts on the display 16, and as illustrated in FIG. 6C, the reference line also changes from the reference line δ2 to δ3.

In this way, in the present embodiment, the camera controller 14 performs control so that in accordance with change in the image captured by the camera 12 as the vehicle 100 moves, the reference line has a curvature corresponding to distortion of the image captured by the camera 12.

Furthermore, when thus changing the displayed reference line, the display state is preferably modified as the reference line approaches the vehicle 100, so as to attract the attention of the driver of the vehicle 100. The display state may, for example, be the color or type of the reference line, whether and how the reference line blinks, and the like. For example, the reference line in the situation illustrated in FIG. 6A may be green, with the reference line changing to yellow in the situation illustrated in FIG. 6B and changing to red in the situation illustrated in FIG. 6C. In this way, the camera controller 14 preferably performs control to superimpose the predetermined information while changing the display state thereof in accordance with the distance between the vehicle 100 and the subject at the indicated position.

(Embodiment 2)

The following describes Embodiment 2 of the present invention.

Embodiment 2 follows the same basic principle as Embodiment 1 described above, while modifying the processing upon the input detector 60 detecting operator input and modifying the position at which the reference line is displayed. Other than these differences, Embodiment 2 may have the same structure as Embodiment 1 described above. Therefore, a description of the same content as Embodiment 1 is omitted.

In the present embodiment, when operator input indicating a predetermined position in the image displayed on the display 16 is detected by the input detector 60, the camera controller 14 determines whether a predetermined object other than the road surface, such as a barrier or the like, is displayed at the position at which the input was detected. Whether a predetermined object other than the road surface, such as a barrier or the like, exists in the image displayed on the display 16 can, for example, be determined using a variety of image recognition techniques, such as contour detection.

In the display 16, when a displayed object other than the road surface, such as a barrier or the like, has height, the actual distance from the object to the vehicle 100 and the actual distance from the road surface displayed around the object to the vehicle 100 do not match at positions other than the ground contact point of the object. Accordingly, in the present embodiment, upon detection of operator input indicating the position of a predetermined object such as a barrier or the like, a reference line is superimposed at the position of the ground contact point of the predetermined object.

Figure 7:
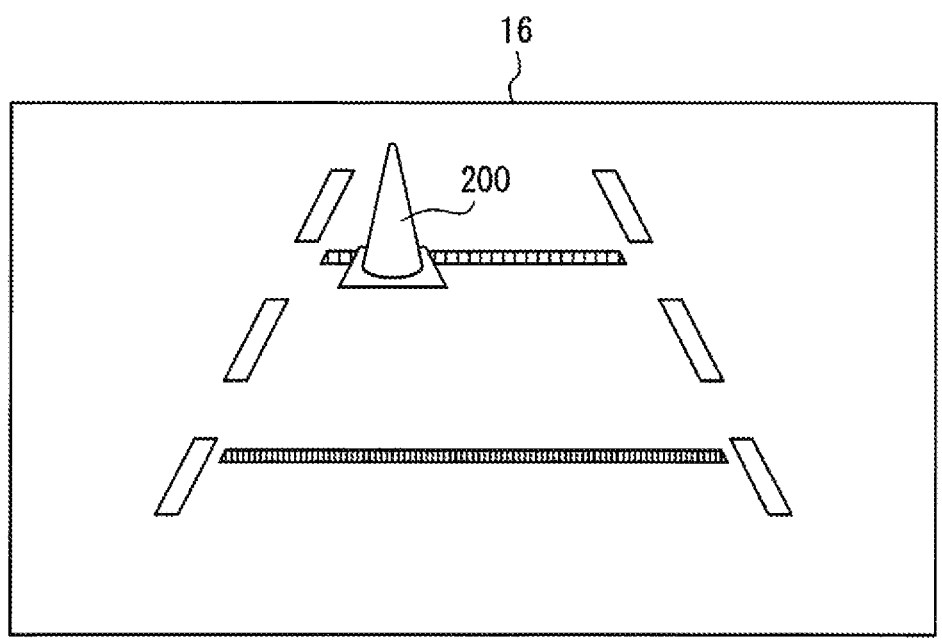
FIG. 7 illustrates an example of displaying image captured by the camera in Embodiment 2.

For example, as illustrated in FIG. 7, assume that input is detected by which the driver contacts a position at the middle or the tip of a cone 200 in the image displayed on the display 16. In this case, upon recognizing by image recognition that the cone 200 is a predetermined object, the camera controller 14 superimposes the reference line using, as a standard, a position that is near a point where the cone 200 contacts the road surface and is closest to the vehicle 100. The "position that is near a point where the cone 200 contacts the road surface and is closest to the vehicle 100" is preferably, within the recognized region of the object, the closest coordinates (closest point) to the lowest level along the Y coordinate axis and the center along the X coordinate axis, i.e. the coordinates (X, Y)=(319, 479). Alternatively, this position may simply be the lowest coordinates (lowest point) in the recognized region of the object.

Figure 8A:
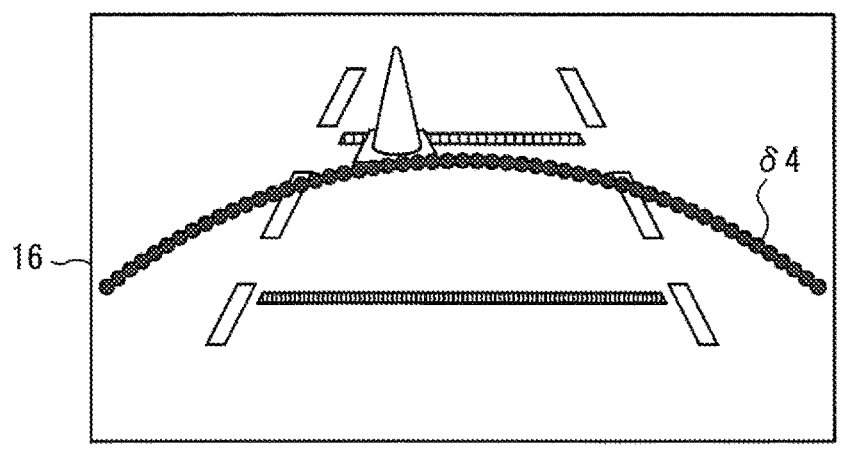
FIGS. 8A, 8B, and 8C illustrate an example of the reference line in Embodiment 2.

FIG. 8A illustrates a reference line δ4 using, as a standard, the position that is near a point where the cone 200 contacts the road surface and is closest to the vehicle 100 (the closest point, or the lowest point) when input is detected at the position of the cone 200 in FIG. 7. By visually confirming this reference line δ4, the driver can easily confirm, within the entire image displayed on the display 16, the position that is the point where the cone 200, displayed at the position input by the driver contacting the image, contacts the ground and that is closest to the vehicle 100.

Figure 8B:
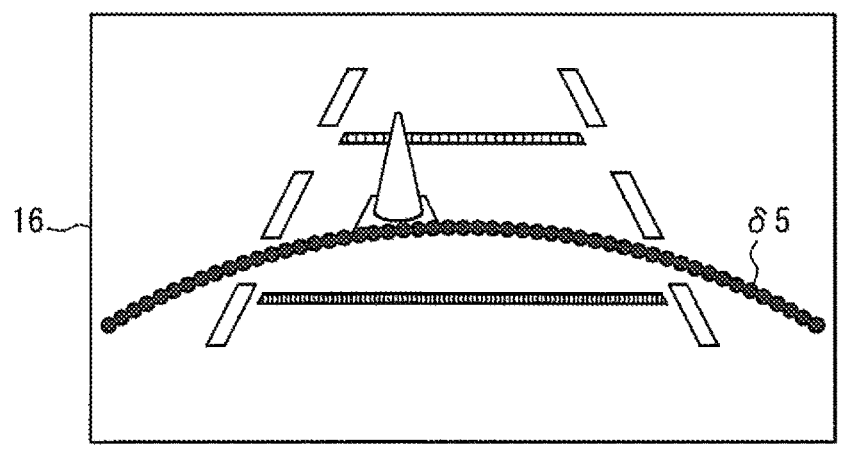
Figure 8C:
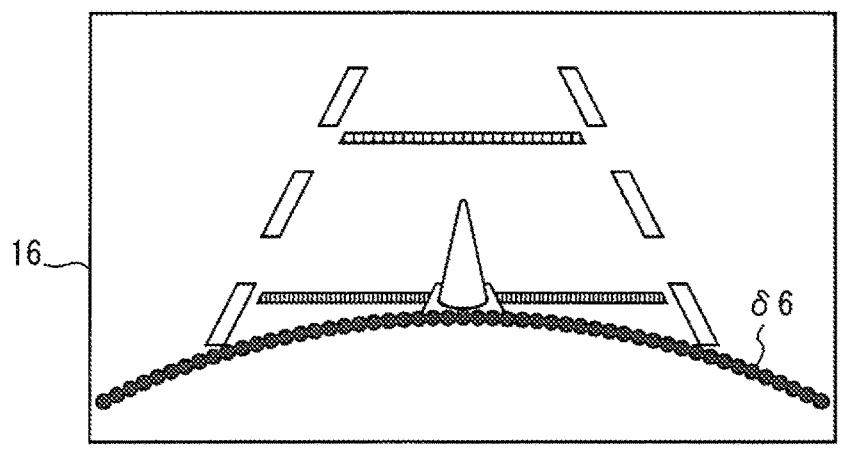

In the present embodiment as well, when the driver moves the vehicle 100 from the situation illustrated in FIG. 8A, the image captured by the camera 12 shifts on the display 16, and as illustrated in FIG. 8B, the reference line preferably also changes from the reference line δ4 to δ5. In this case, upon the driver moving the vehicle 100 further from the situation illustrated in FIG. 8B, the image captured by the camera 12 shifts on the display 16, and as illustrated in FIG. 8C, the reference line also changes from the reference line δ5 to δ6.

In this way, in the present embodiment, when a predetermined object is recognized as existing at the position at which input is detected, the camera controller 14 performs control to superimpose predetermined information using, as a standard, a position that is near a ground contact point of the predetermined object and is closest to the vehicle 100. In this case, in accordance with change in the image captured by the camera 12 as the vehicle 100 moves, the camera controller 14 preferably performs control to change a position of the predetermined information that is superimposed. In the present embodiment as well, the camera controller 14 preferably performs control to superimpose the predetermined information while changing the display state thereof in accordance with the distance between the vehicle 100 and the subject at the position indicated by operator input.

In the present embodiment, when no predetermined object, such as a barrier or the like, is recognized at the position at which operator input is detected, it can be considered that the operator wants to display a reference line using, as a standard, the position of the road surface rather than a predetermined object, and the processing described in Embodiment 1 may be performed.

(Embodiment 3)

The following describes Embodiment 3 of the present invention.

Embodiment 3 follows the same basic principle as Embodiment 1 described above, while displaying a predetermined reference value instead of a predetermined reference line on the display 16. Other than this difference, Embodiment 3 may have the same structure as Embodiment 1 described above. Therefore, a description of the same content as Embodiment 1 is omitted.

In the present embodiment, when operator input indicating a predetermined position is detected by the input detector 60, the camera controller 14 reads the distance between the vehicle 100 and the subject at the position from the storage 50 based on correspondence such as that illustrated in FIG. 4. Once the distance between the vehicle 100 and the subject at the position for the coordinates at which input was detected is thus read, the camera controller 14 performs control to output the numerical value of the distance as a reference value superimposed on the image captured by the camera 12. In this case, the camera controller 14 preferably performs control to superimpose the reference value immediately by the coordinates at which the input was detected, such as directly above or to the right of the coordinates at which input was detected. Furthermore, when reading the numerical value of the distance between the vehicle 100 and the subject at the position for which input was detected from the storage 50, the numerical value is preferably converted to an easy-to-read reference value for the operator, such as the driver of the vehicle 100, for example by using an approximate value or changing the units.

Figure 9:
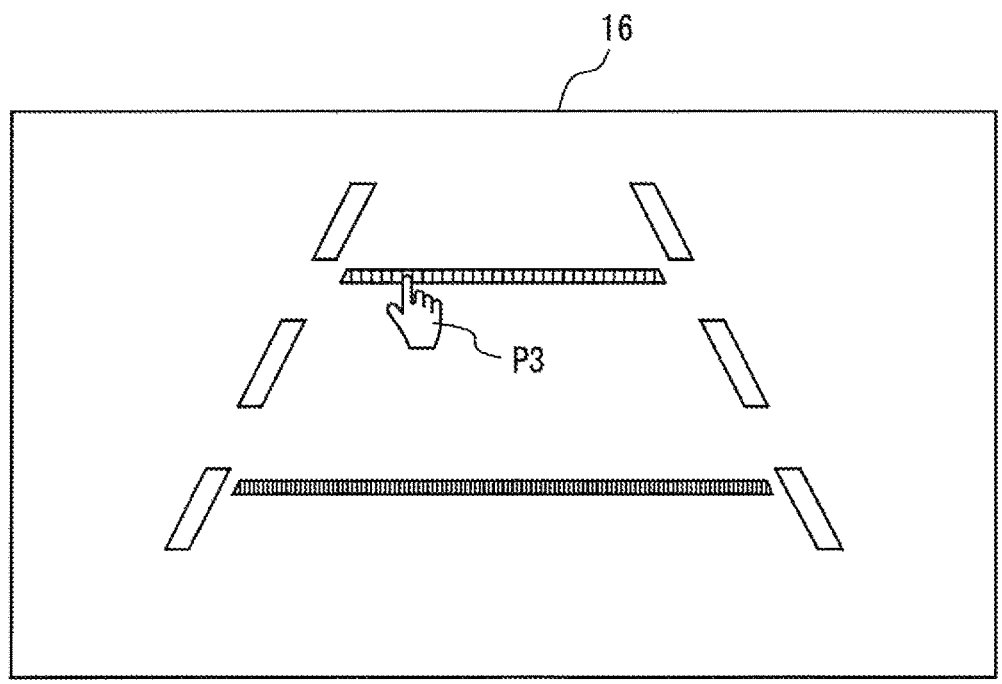
FIG. 9 illustrates an example of displaying image captured by the camera in Embodiment 3.
Figure 10A:
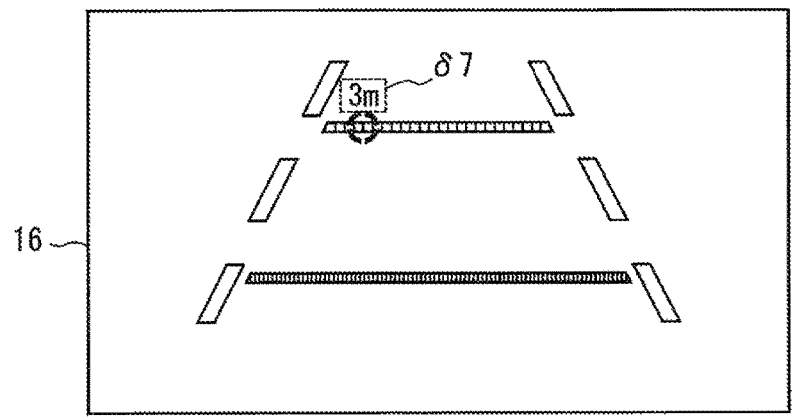
FIGS. 10A, 10B, and 10C illustrate an example of the reference value in Embodiment 3.

For example, as illustrated in FIG. 9, assume that input is detected by which the driver contacts position P3 displayed on the display 16. As illustrated in FIG. 10A, using the position at which contacting input was detected as a standard, the actual distance (3 m) between the vehicle 100 and the subject at that position is then displayed on the display 16 as a reference value δ7. By visually confirming this reference δ7, the driver can easily confirm, on the display 16, how far the position input by the driver on the image is from the vehicle 100.

Figure 10B:
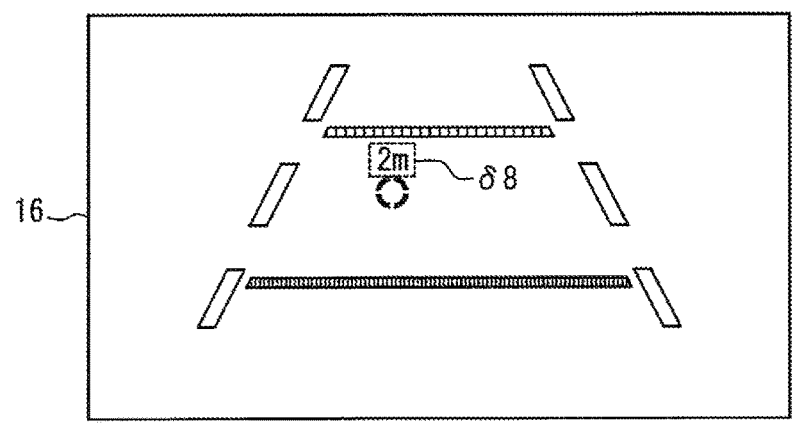
Figure 10C:
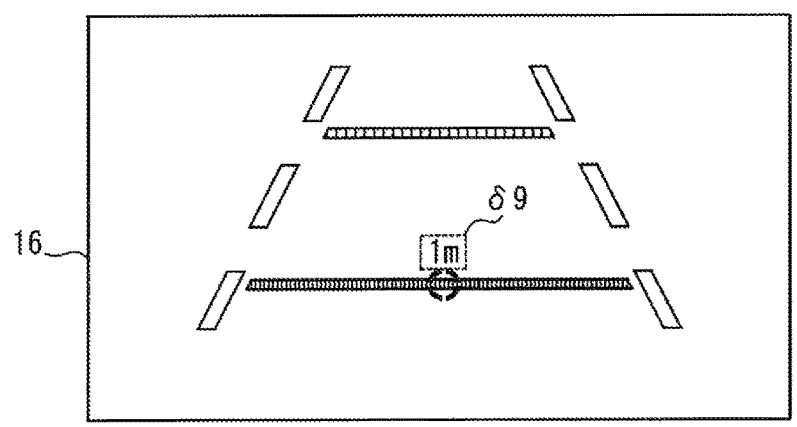

In the present embodiment as well, when the driver moves the vehicle 100 from the situation illustrated in FIG. 10A, the image captured by the camera 12 shifts on the display 16 in accordance with the speed of movement, and as illustrated in FIG. 10B, the reference value preferably also changes from δ7 to δ8 (2 m). In other words, the coordinates corresponding to the position after movement are specified as in the example illustrated in FIGS. 3 and 4, and the value corresponding to the specified coordinates is read. Similarly, upon the driver moving the vehicle 100 further from the situation illustrated in FIG. 10B, the image captured by the camera 12 shifts on the display 16, and as illustrated in FIG. 10C, the reference value also changes from δ8 to δ9 (1 m). In the present embodiment as well, when changing the displayed reference value, the display state is preferably modified as the distance indicated by the reference value approaches the vehicle 100, so as to attract the attention of the driver of the vehicle 100. The display state may, for example, be the color of the reference value, the type of surrounding line displayed, whether and how the reference value blinks, and the like.

In this way, in the present embodiment, the camera controller 14 performs control to superimpose the predetermined information as a reference value representing, as a numerical value, the distance between the vehicle 100 and the subject at the position indicated by operator input.

In the above-described embodiment, the image captured by the camera 12 is assumed to be image captured by one camera provided with a lens having a wide field of view, such as a fisheye lens or the like. The present invention is not, however, limited to the above-described embodiment, and the image captured by the camera 12 may be a combination of images captured by a plurality of cameras 12.

When thus integrating and combining images captured by a plurality of cameras 12, it is assumed that the captured images may not combine smoothly in portions where the images are integrated. According to the present embodiment, by calculating or pre-storing reference lines corresponding to such forms of combination, the driver can easily discern the degree of distortion in the image even when image that is not combined smoothly is displayed on the display 16.

As described above, in the present invention a reference line or reference value constituted by a simple image is superimposed on image captured by the camera 12. As a result, the driver can correctly obtain a sense of direction and a sense of distance with wide-angle image captured by a car-mounted camera.

Although the present invention has been described based on drawings and examples, it is to be noted that various changes and modifications will be apparent to those skilled in the art based on the present disclosure. Therefore, such changes and modifications are to be understood as included within the scope of the present invention. For example, the functions and the like included in the various members, units, steps, and the like may be reordered in any logically consistent way. Furthermore, when embodying a method according to the present invention, units or steps may be combined into one or divided.

In the above-described embodiments, the camera controller 14 performs control so that processing is executed to superimpose and output a reference line on acquired image of the camera 12. In this case, data for image output by the camera controller 14 is output in a state in which image data for the reference line is already superimposed thereon. The present invention is not, however, limited to the above-described embodiment. For example, the camera controller 14 may output the image captured by the camera 12 as is. In this case, for example the controller 30 can perform control so that processing is executed to superimpose and output a reference line on the acquired image of the camera 12.

In Embodiments 1 and 2 described above, when the vehicle 100 moves, the reference line shifts along with a shift in image on the display 16 in the description of FIGS. 6A to 6C and 8A to 8C. In this case, each time the reference line moves, it is assumed that by reading the distance between the subject and the vehicle 100 from a correspondence table as in FIG. 4, a new reference line is rewritten. It is also assumed that if this processing is, for example, executed each time the reference line shifts one pixel, then when the processing speed of the image processing device 40 is not very fast, the processing load will grow large.

Figure 11:
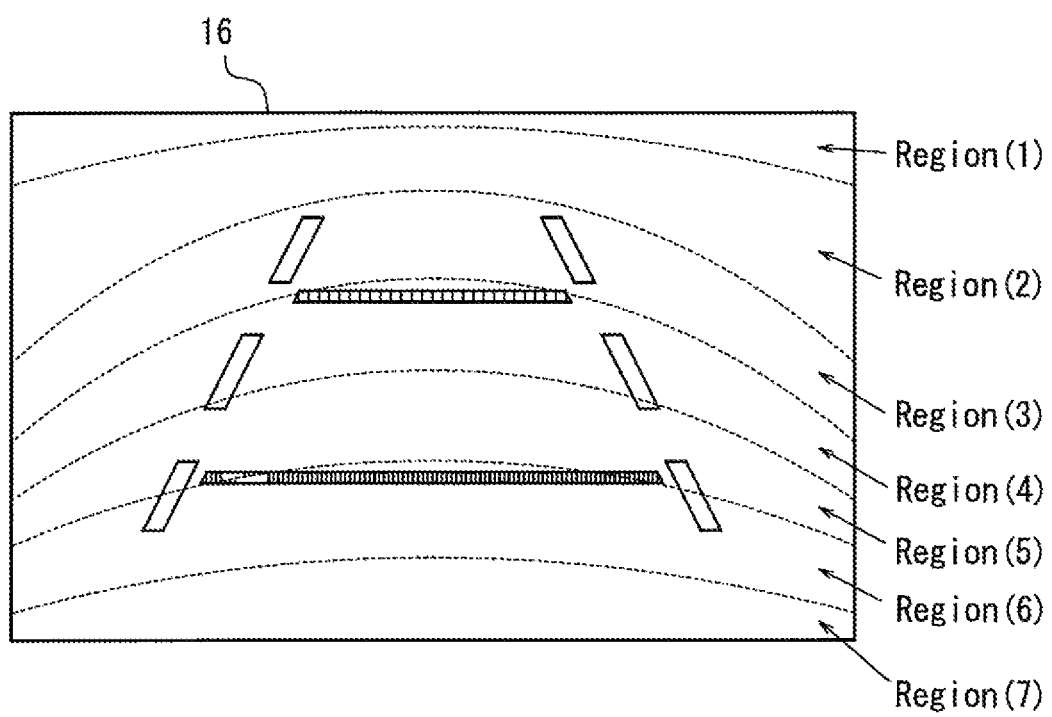
FIG. 11 illustrates an example of reference lines in a modification to an embodiment of the present invention.
Figure 12:
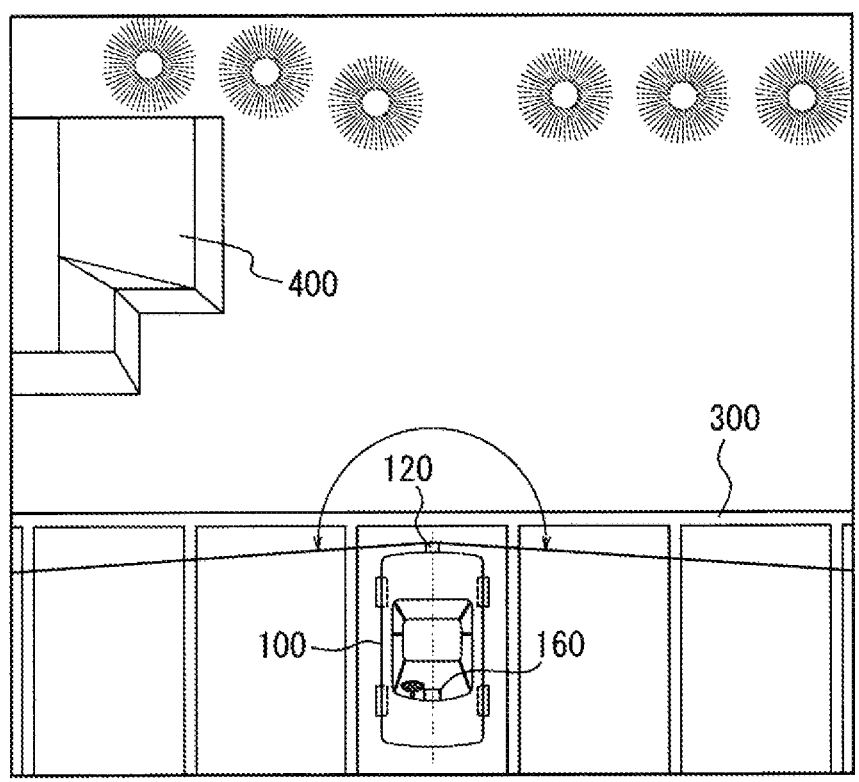
FIG. 12 is a view from above of a car with a camera mounted thereon and of a parking lot.
Figure 13:
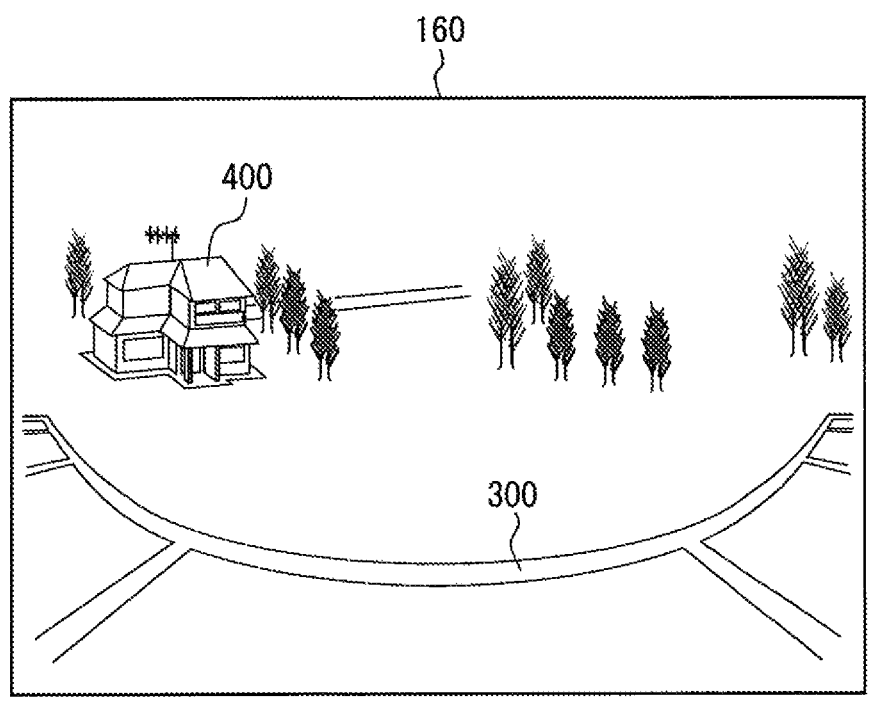
FIG. 13 illustrates image captured by a camera capable of wide-angle capturing.

Accordingly, in Embodiments 1 and 2 described above, when the reference line shifts along with a shift in the image on the display 16, then if the shift is within a predetermined range, processing may be executed to simply shift a reference line with the same curvature rather than rewriting the reference line. In this case, for example by dividing the image displayed on the display 16 into several virtual regions, such as regions (1) through (7) as illustrated in FIG. 11, rewriting of the reference line may be omitted within each region. In each region, after displaying a reference line initially generated for superimposition within the region, or after displaying a reference line with a curvature prepared in advance within the region, the reference line may be shifted as is. When passing from one region to the next, a reference line for initial superimposition within the next region is generated, or a reference line with a curvature prepared in advance within the next region is displayed.

In this way, in the present invention, the camera controller 14 may perform control to display, within each of a plurality of regions yielded by dividing the image captured by the camera 12 in accordance with the distance between the subject and the vehicle 100, a reference line with the same curvature. With this approach, the effect can be expected of reducing the processing load of the functional units, focusing on the camera controller 14 and/or the controller 30.

Furthermore, in the above-described embodiments, the guidelines α, β, γ, and the like as illustrated in FIGS. 3 and 5 are illustrated as lines that become a standard for the travelling direction or the like of the vehicle 100. In the present invention, however, such guidelines are not essential and may be omitted from display on the display 16.

In the above-described embodiments, when superimposing these guidelines for display on the display 16, the guidelines may be changed on the display 16 in accordance with a steering operation of the vehicle 100. For example, in FIG. 5, the guidelines βR and βL are displayed assuming that the vehicle 100 is moving straight. However, when the driver is turning to the left or right while moving the vehicle 100 in reverse, for example, these guidelines βR and βL may be displayed by changing the direction, curvature, and the like towards the direction in which the vehicle 100 turns.

In this way, in the present invention, when superimposing the predetermined information on the image captured by the camera 12, the camera controller 14 may perform control to superimpose a guideline suggesting a path for the vehicle 100. In this case, the camera controller 14 may perform control to superimpose the guideline by changing the guideline in accordance with the steering angle of the vehicle 100.

REFERENCE SIGNS LIST

10: Bus
12: Camera
14: Camera controller
16: Display
18: Ignition switch
20: Steering sensor
22: Brake sensor
24: GPS
26: Lights
28: Speaker
30: Controller
40: Image processing device
50: Storage
60: Input detector
100: Vehicle (car)

The invention claimed is:

1. An image processing device for superimposing predetermined information on image captured by a camera that attaches to a vehicle and is capable of wide-angle capturing in a travelling direction of the vehicle, the image processing device comprising:
  a controller, connectively coupled to a memory, and configured to perform control to superimpose information upon detecting, in a state of outputting an image captured by the camera, input indicating a predetermined position in the image, the information relating to a distance between the vehicle and the position indicated in the image captured by the camera, wherein the controller performs control to superimpose the predetermined information as a reference line connecting points in the image at a distance from the vehicle equivalent to a distance from the vehicle of the position indicated in the image captured by the camera, the controller determining the points based on distortion data associated with the camera, wherein
  the camera comprises a lens configured to capture a wide-angle in a traveling direction of the vehicle, and
  the distortion data is data which accounts for distortion in the image caused by the lens.

2. The image processing device according to claim 1, wherein the controller performs control so that in accordance with change in the image captured by the camera as the vehicle moves, the reference line has a curvature corresponding to distortion of the image captured by the camera.

3. The image processing device according to claim 1, wherein the controller performs control to display within each of a plurality of regions yielded by dividing the image captured by the camera in accordance with a distance between a subject and the vehicle, a reference line in each respective region, said plurality of reference lines having a same curvature.

4. The image processing device according to claim 1, further comprising
a storage configured to store a distance between the vehicle and a subject in the image at coordinates of the image captured by the camera, wherein
the controller performs control to superimpose the predetermined information by reading the distance, stored in the storage, between the vehicle and the subject in the image at coordinates of the image captured by the camera.

5. The image processing device according to claim 1, wherein the controller performs control to superimpose the predetermined information as a reference value representing a distance between the vehicle and a subject at the indicated position as a numerical value.

6. The image processing device according to claim 1, wherein when a predetermined object is recognized as existing at the position at which the input is detected, the controller performs control to superimpose the predetermined information using, as a standard, a position that is near a ground contact point of the predetermined object and is closest to the vehicle.

7. The image processing device according to claim 1, wherein in accordance with change in the image captured by the camera as the vehicle moves, the controller performs control to continuously change a position of the predetermined information that is superimposed.

8. The image processing device according to claim 7, wherein in accordance with a distance between the vehicle and a subject at the indicated position, the controller performs control to change a display state of the predetermined information that is superimposed.

9. The image processing device according to claim 1, wherein when superimposing the predetermined information on the image captured by the camera, the controller performs control to superimpose a guideline suggesting a path for the vehicle.

10. The image processing device according to claim 9, wherein the controller performs control to superimpose the guideline by changing the guideline in accordance with a steering angle of the vehicle.

11. The image processing device according to claim 1, further comprising
an input detector configured with a touch panel, wherein
the controller performs control to detect input indicating a predetermined position in the image via the input detector.

12. The image processing device according to claim 1, further comprising
an input detector configured with an operation key, wherein
the controller performs control to detect input indicating a predetermined position in the image via the input detector.

13. The image processing device according to claim 1, wherein the image captured by the camera is image captured by a camera comprising a fisheye lens.

14. The image processing device according to claim 1, wherein the image captured by the camera is a combination of images captured by a plurality of cameras.

15. An image processing method for superimposing predetermined information on image captured by a camera that attaches to a vehicle and is capable of wide-angle capturing in a travelling direction of the vehicle, the image processing method comprising the step of:
performing control to superimpose information upon detecting, in a state of outputting an image captured by the camera, input indicating a predetermined position in the image, the information relating to a distance between the vehicle and the position indicated in the image captured by the camera, wherein the predetermined information is superimposed as a reference line connecting points in the image at a distance from the vehicle equivalent to a distance from the vehicle of the position indicated in the image captured by the camera, and the points are based on distortion data associated with the camera, wherein
the camera comprises a lens configured to capture a wide-angle in a traveling direction of the vehicle, and
the distortion data is data which accounts for distortion in the image caused by the lens.

16. An image display system comprising:
a camera that attaches to a vehicle and is capable of wide-angle capturing in a travelling direction of the vehicle;
a controller configured to superimpose predetermined information on image captured by the camera; and
a display configured to display the image captured by the camera and the predetermined information;
wherein the controller is configured to perform control to detect input indicating a predetermined position on an input detector in the image displayed on the display, and wherein in a state of the display displaying image captured by the camera, when the input detector detects input indicating a predetermined position in the image, the controller performs control to superimpose information relating to a distance between the vehicle and the position indicated in the image captured by the camera, wherein the controller performs control to superimpose the information as a reference line connecting points in the image at a distance from the vehicle equivalent to a distance from the vehicle of the position indicated in the image captured by the camera, the controller determining the points based on distortion data associated with the camera, wherein
the camera comprises a lens configured to capture a wide-angle in a traveling direction of the vehicle, and
the distortion data is data which accounts for distortion in the image caused by the lens.

17. The image processing device according to claim 1, wherein
the distortion data comprises a correspondence table associating each point in a plurality of points in the image with a distance from the vehicle which accounts for image distortion associated with the camera.

18. The image processing device according to claim 1, wherein
the distortion data depends on at least one of the vertical height of the camera and the angle at which the camera is mounted on the vehicle.

* * * * *